(12) United States Patent
Buissette et al.

(10) Patent No.: US 8,980,130 B2
(45) Date of Patent: Mar. 17, 2015

(54) SUBMICRON RARE-EARTH BORATES AND PREPARATION/LUMINOSHORS THEREOF

(75) Inventors: Valerie Buissette, Paris (FR); Thierry Le-Mercier, Rosny-Sous-Bois (FR); Yvan Montardi, Cormeilles-en-parisis (FR); Laurent Thiers, Savigny-sur-Orge (FR)

(73) Assignee: Rhodia Operations, Paris (FR)

( * ) Notice: Subject to any disclaimer, the term of this patent is extended or adjusted under 35 U.S.C. 154(b) by 1980 days.

(21) Appl. No.: 12/083,492

(22) PCT Filed: Oct. 9, 2006

(86) PCT No.: PCT/FR2006/002258
§ 371 (c)(1),
(2), (4) Date: Dec. 1, 2009

(87) PCT Pub. No.: WO2007/042653
PCT Pub. Date: Apr. 19, 2007

(65) Prior Publication Data
US 2010/0065780 A1  Mar. 18, 2010

(30) Foreign Application Priority Data
Oct. 13, 2005  (FR) ...................................... 05 10446

(51) Int. Cl.
C09K 11/02 (2006.01)
C09K 11/77 (2006.01)
C01B 35/12 (2006.01)

(52) U.S. Cl.
CPC .............. *C01B 35/127* (2013.01); *C01B 35/12* (2013.01); *C01B 35/128* (2013.01); *C09K 11/778* (2013.01); *C09K 11/02* (2013.01)
USPC .................................................. 252/301.4 R

(58) Field of Classification Search
USPC ............ 252/301.4 R; 423/263, 277; 516/922, 516/88; 508/156, 186; 510/339, 345, 420
See application file for complete search history.

(56) References Cited

U.S. PATENT DOCUMENTS

| | | | |
|---|---|---|---|
| 3,412,104 A * | 11/1968 | McIntosh et al. ............. | 524/313 |
| 6,238,593 B1 * | 5/2001 | Huguenin et al. ..... | 252/301.4 R |
| 6,352,678 B1 | 3/2002 | Huguenin et al. | |
| 6,596,196 B2 | 7/2003 | Huguenin et al. | |
| 7,208,130 B2 | 4/2007 | Braconnier et al. | |
| 2002/0048543 A1 * | 4/2002 | Huguenin et al. ............ | 423/277 |
| 2002/0179886 A1 * | 12/2002 | Kumar ................... | 252/301.4 R |
| 2003/0232005 A1 | 12/2003 | Okada et al. | |
| 2004/0028592 A1 * | 2/2004 | Akimoto et al. .............. | 423/263 |
| 2004/0178389 A1 * | 9/2004 | Furusawa et al. ...... | 252/301.4 R |
| 2005/0242702 A1 * | 11/2005 | Justel et al. ................... | 313/489 |
| 2009/0256115 A1 * | 10/2009 | Buissette et al. ....... | 252/301.4 R |

FOREIGN PATENT DOCUMENTS

| | | |
|---|---|---|
| FR | 2 743 555 A1 | 7/1997 |
| WO | WO 01/10781 A1 | 2/2001 |
| WO | WO 01/49605 A2 | 7/2001 |
| WO | WO 2007042653 A1 * | 4/2007 |

OTHER PUBLICATIONS http://www.merriam-webster.com/dictionary/monocrystal, printed Jun. 13, 2014.*
http://www.merriam-webster.com/dictionary/monodisperse, printed Jun. 13, 2014.*
http://www.merriam-webster.com/dictionary/uniformity, printed Jun. 13, 2014.*
http://www.thefreedictionary.com/slurry, printed Jun. 13, 2014.*
http://www.merriam-webster.com/dictionary/slurry, printed Jun. 13, 2014.*
Wei et al., "Size Dependence of Luminescent Properties for Hexagonal $YBO_3$:Eu Nanocrystals in the Vacuum Ultraviolet Region", Journal of Applied Physics, Jun. 15, 2003, pp. 9783-9788, vol. 93, No. 12, New York, New York, USA.
International Search Report corresponding to PCT/FR 2006/002258, issued on Feb. 21, 2007.

* cited by examiner

Primary Examiner — Carol M Koslow
Assistant Examiner — Lynne Edmondson

(57) ABSTRACT

Liquid phase suspensions of substantially monocrystalline rare-earth borate particles, the mean size thereof ranging from 100 to 400 nm, are prepared by roasting a rare earth borocarbonate or hydroxyborocarbonate at a temperature which is sufficient for forming a borate and obtaining a product whose specific surface area is equal to or greater than 3 $m^2$/g and then wet grinding the roasted product; such borates are useful in the form of luminophors, in particular, as luminescent transparent materials.

16 Claims, 1 Drawing Sheet

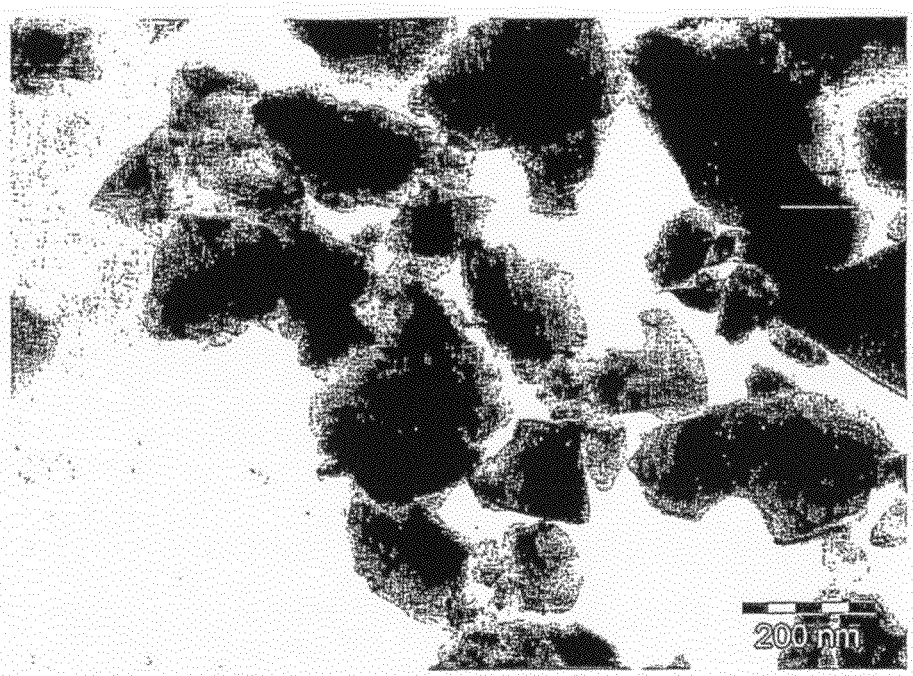

SUBMICRON RARE-EARTH BORATES AND PREPARATION/LUMINOSHORS THEREOF

CROSS-REFERENCE TO PRIORITY/PCT APPLICATIONS

This application claims priority under 35 U.S.C. §119 of FR 0510446, filed Oct. 13, 2005, and is a continuation of PCT/FR 2006/002258, filed Oct. 9, 2006 and designating the United States (published in the French language on Apr. 19, 2007, as WO 2007/042653 A1; the title and abstract were also published in English), each hereby expressly incorporated by reference in its entirety and each assigned to the assignee hereof.

The present invention relates to a submicron rare-earth borate, its preparation method and the use of this borate as a phosphor.

The fields of luminescence and electronics are currently experiencing significant developments. As an example of these developments, mention may be made of the improvement of plasma systems (screens and lamps) for novel display and illumination techniques. One concrete application is that of replacing current television screens with flat screens. These novel applications require phosphor materials that have further improved properties. Thus, besides their luminescence property, these materials are required to have specific morphology or particle size characteristics so as, in particular, to make them easier to use in the desired applications.

More precisely, phosphors are required to be as far as possible in the form of individual particles and to have a very small, submicron size, especially below 500 nm.

Furthermore, and still within the context of development in the fields of luminescence and electronics, it is sought to obtain transparent and luminescent materials in the form of films.

The main object of the invention is to provide products having such particle size characteristics.

A second object of the invention is to obtain a luminescent material of the type above.

For this purpose, the rare-earth borate of the invention is characterized in that it is in the form of a suspension of substantially single-crystal particles, having an average size between 100 and 400 nm, in a liquid phase.

The invention also relates to a process for preparing a borate such as defined above, which is characterized in that it comprises the following steps:
  a rare-earth borocarbonate or hydroxyborocarbonate is calcined at a high enough temperature to form a borate and to obtain a product having a specific surface area of at least 3 m²/g; and
  wet grinding of the product resulting from the calcination is carried out.

Other features, details and advantages of the invention will appear more fully still on reading the description which follows, and also the various concrete, but nonlimiting, examples intended to illustrate it and the appended drawing in which:

FIG. 1 is a TEM photo of a suspension according to the invention.

The term "rare earth" is understood in the present description to mean the elements of the group composed of yttrium and the elements of the Periodic Table having an atomic number between 57 and 71 inclusive.

The expression "specific surface area" is understood to mean the BET specific surface area determined by nitrogen adsorption in accordance with the ASTM D 3663-78 standard established from the Brunauer-Emmett-Teller method described in the periodical "The Journal of the American Chemical Society, 60, 309 (1938)".

The rare-earth borate of the invention is preferably of the orthoborate type, of formula $LnBO_3$, Ln representing at least one rare earth. However, the invention also applies to a borate of rare-earth oxyborate type of formula $Ln_3BO_6$. Of course, the borate of the invention may be in the pure phase but it may also be in the form of a mixture of phases, the main phase being the orthoborate or oxyborate phase, minor phases possibly also being present. It is emphasized here that the invention applies to borates of one or more rare earths. This is why, in the whole of the description, everything that is described on the subject of a rare-earth borate, a rare-earth carbonate or hydroxycarbonate and on the subject of their preparation processes should be understood as applying also to the case where several rare earths are present.

The rare earth forming the borate of the invention, that is to say that which forms, with the boron, the matrix of the product, generally belongs to the group of rare earths which have no luminescence property. Thus, this rare earth forming the borate may be chosen, alone or in combination, from the group comprising yttrium, gadolinium, lanthanum, lutetium and scandium. It may more particularly be yttrium and/or gadolinium.

The borate may, in addition, comprise one or more dopants. In a manner known per se, the dopants are used in combination with the matrix to give it luminescence properties. These dopants may be chosen from antimony, bismuth and the rare earths. In the latter case, the rare earth or earths used as a dopant are chosen from the group of rare earths having luminescence properties and they are different from the rare earth forming the borate. As a dopant rare earth, mention may be made of cerium, terbium, europium, dysprosium, holmium, ytterbium, neodymium, thulium, erbium and praseodymium. More particularly, terbium, thulium, cerium and europium are used. The dopant content is usually at most 50 mol % relative to the rare-earth borate matrix ([dopant]/[Σ Ln] ratio), Σ Ln representing the sum of rare earths and dopants in the borate.

The borate of the invention is composed of particles which have the main feature of being single-crystal of submicron size.

More precisely, these particles have an average size ($d_{50}$) between 100 and 400 nm, more particularly between 100 and 300 nm and more particularly still between 100 and 200 nm. For certain applications of the borate of the invention, for example for manufacturing a transparent material, as described later on, it is possible to use a borate whose particles have an even smaller size, between 100 nm and 150 nm.

Furthermore, these particles may have a narrow particle size distribution; more precisely their dispersion index may be at most 1, preferably at most 0.7 and more preferably still at most 0.5.

Throughout the description, the average size and the dispersion index are values obtained by employing the laser diffraction technique using a laser particle size analyzer (weight distribution).

The expression "dispersion index" is understood to mean the ratio:

$$\sigma/m = (d_{84} - d_{16})/2d_{50}$$

in which:
  $d_{84}$ is the particle diameter for which 84% of the particles have a diameter of less than $d_{84}$;
  $d_{16}$ is the particle diameter for which 16% of the particles have a diameter of less than $d_{16}$; and
  $d_{50}$ is the average diameter of the particles.

It is specified here that the average size measurements are carried out on suspensions which have undergone the action of an ultrasonic probe according to well-known methods used for this type of measurement.

The other feature of the particles forming the borate of the invention is their single-crystal nature. Specifically, for the most part, that is to say for around at least 90% of them and, preferably for all of them, these particles are composed of a single crystal.

This single-crystal appearance of the particles may be demonstrated by the transmission electron microscopy (TEM) analysis technique.

For the suspensions whose particles are in a size range of at most around 250 nm, the single-crystal appearance of the particles may also be demonstrated by comparing the average size of the particles measured by the laser diffraction technique mentioned above with the value of the measurement of the size of the crystal or of the coherent domain obtained from X-ray diffraction (XRD) analysis. It is specified here that the value measured by XRD corresponds to the size of the coherent domain calculated from the width of the diffraction [102] line. The two values: laser diffraction average size and XRD average size have, in effect, the same order of magnitude, that is to say that they are in a ratio of at most 2, more particularly of at most 1.5.

As a result of their single-crystal nature, the borate particles of the invention are in the form of well-separated and individual particles. There are no or few particle agglomerates. This good individualization of the particles may be demonstrated by comparing the $d_{50}$ measured by the laser diffraction technique and that measured from an image obtained by transmission obtained by these two techniques have the same order of magnitude, in the proportions given above.

The borate of the invention is generally in the form of a suspension of the particles which have just been described in a liquid phase. This suspension may settle over time and this settling may lead to an agglomeration of the particles together. However, and this is an important property of the suspension of the invention, simple stirring using very little mechanical energy, especially an ultrasound treatment, for example with a power of 120 W for 3 minutes, makes it possible to deagglomerate these particles and therefore to return to a suspension whose particles have all the properties which were given above.

The liquid phase of the suspensions according to the invention may be water or a water/water-miscible solvent mixture or else an organic solvent.

The organic solvent may most particularly be a water-miscible solvent. Mention may be made, for example, of alcohols such as methanol or ethanol, glycols such as ethylene glycol, acetate derivatives of glycols such as ethylene glycol monoacetate, glycol ethers, polyols or ketones.

This liquid phase may also comprise a dispersant.

This dispersant may be chosen from known dispersants, for example from alkali-metal polyphosphates ($M_{n+2}P_nO_{3n+1}$) or metaphosphates ($[MPO_3]_n$) (M denoting an alkali metal such as sodium), especially such as sodium hexameta-phosphate. It may also be chosen from alkali-metal silicates (sodium silicate), aminoalcohols, phosphonates, citric acid and its salts, derivatives of phosphosuccinic acid (($HOOC)_n$—R—$PO_3H_2$ where R is an alkyl residue), polyacrylic, polymethacrylic and alkyl residue), polyacrylic, polymethacrylic and polystyrene sulfonic acids and salts thereof. Citric acid and metaphosphates are most particularly preferred.

The amount of dispersant may be between 1% and 10%, more particularly between 2.5% and 5%, this amount being expressed by weight of dispersant relative to the weight of solid in the dispersion.

The concentration of the suspension may vary over a wide range. By way of example, it may be between around 10 g/l and around 200 g/l, more particularly between 40 g/l and 100 g/l.

The invention also relates to a borate which is in solid form, that is to say in the form of a powder which has the property of being able to result in the borate in the form of a suspension described above. In other words, when this powder is redispersed in a liquid phase, after simple stirring, without it being necessary to apply high mechanical energy, especially, here too, by simple ultrasound treatment, for example with a power of around 450 W, a suspension of the borate is obtained that has the properties given above. Of course, anything which has been described previously regarding the nature and the composition of the borate: nature of the crystallographic phase (orthoborate), nature and amount of the rare earth and of the dopant, applies in the same way for the borate in solid form.

The process for preparing the borate of the invention in the form of a suspension will now be described.

In this process, use is made, as a singular raw material, of a rare-earth borocarbonate or hydroxyborocarbonate (LnB($CO_3)_3$ or LnB(OH)$_4$CO$_3$ respectively, in the case of preparing an orthoborate).

This borocarbonate or this hydroxyborocarbonate is calcined at a high enough temperature to form a borate and to obtain a product having a specific surface area of at least 3 $m^2/g$.

This surface area may more particularly be between 3 $m^2/g$ and 10 $m^2/g$ and more particularly still between 5 $m^2/g$ and 8 $m^2/g$.

The temperature which is high enough to obtain the borate phase is generally at least 450° C., more particularly at least 500° C. and it may, for example, be between 450° and 700° C. The calcination time depends on the temperature and it is generally even shorter when the temperature is raised. By way of example, a calcination at 500° C. for two hours makes it possible to obtain this phase.

The calcination must also make it possible to obtain the specific surface area values which have been given above. These values are generally obtained for a calcination at a temperature between around 800° C. and around 900° C., more particularly between 825° C. and 875° C. Here too, the calcination time is even shorter when the temperature is raised. It may thus be between, for example, 10 minutes and 5 hours.

These temperature and specific surface area conditions make it possible to obtain a product having the most suitable properties for obtaining, after wet grinding, the rare-earth borate suspension of the invention.

It will be noted that the calcination described above may be carried out either in two separate steps or two separate times, or else as a single step, that is to say with a gradual temperature climb such that the product which undergoes the calcination is subjected to a temperature and to a calcination time that are sufficient to obtain the borate phase. For example, it is possible to observe a hold at 500° C. for a duration of two hours, then to increase the calcination temperature again in order to attain a higher value, for example between 800° C. and 900° C.

The calcination which has been described above may be carried out in air. It is not necessary to calcine under a reducing atmosphere but it would not be outside the scope of the present invention to use, at least in a second part of this calcination, reducing (for example, hydrogen) or inert (argon) atmospheres or mixtures of the latter.

The last step of the process consists in grinding the product resulting from the calcination.

Wet grinding is carried out in water or else in a water/solvent mixture or in an organic solvent of the same type as the solvents which have been described above for the liquid phase forming the suspension. In a known manner, it is possible to use a dispersant, of the type of those described above, during the grinding step.

At the end of the wet grinding, the borate of the invention is obtained in the form of a suspension.

It will be noted that in the case of a suspension in a water/solvent mixture or in an organic solvent, this suspension may be prepared from an aqueous suspension such as obtained by the process which has just been described and by addition of organic solvent to this aqueous suspension then, if necessary, distillation to remove the water.

The rare-earth borocarbonate or hydroxyborocarbonate used as the raw material may be prepared according to various processes.

A first process will be described below which starts from a carbonate or a hydroxycarbonate of a rare earth or else from a mixture of carbonates or hydroxycarbonates of different rare earths or of mixed rare-earth carbonates or hydroxycarbonates in the case of preparing borates of several rare earths. The rare-earth carbonates or hydroxycarbonates are products that are known per se and that it is possible to obtain, for example, by precipitation of one or more rare-earth salts with ammonium carbonate or bicarbonate.

The first step of the process consists in reacting the starting carbonate or hydroxycarbonate with the boric acid.

According to one feature of this process, the starting reaction medium is in the form of an aqueous solution. This means that the amount of water present in the reaction medium is such that the water/boric acid+carbonate weight ratio is at least 300%, more particularly at least 1000%. This ratio may more particularly still be at least 1500%.

Preferably, the reaction is carried out at high temperature, for example at a temperature between 40° C. and 90° C.

It is possible to work with an excess of boric acid. This excess may be, for example, between 5 mol % and 100 mol % ([B]/[Ln]=1.05 to 2, Ln=rare earth).

It may be advantageous to carry out the reaction while removing the $CO_2$ formed during the latter. This removal may be carried out, for example, by purging the reaction medium with an inert gas such as nitrogen. This variant makes it possible to obtain products having a smaller particle size.

According to another variant, the reaction is carried out by attacking the rare-earth carbonate or hydroxy-carbonate with boric acid in the mother liquors from precipitation of the latter. It is advantageous to carry out this attack on a freshly prepared carbonate or hydroxycarbonate.

At the end of the reaction, a precipitate is obtained which is separated from the reaction medium by any known means, for example by filtration and which, optionally, is washed then dried. After drying, it is also possible to carry out an additional washing step with a dilute acid, for example nitric acid, to remove possible traces of carbonate that have not completely reacted.

A second process may also be carried out to prepare a rare-earth borocarbonate or hydroxyborocarbonate.

This second process comprises the following steps:
boric acid and a rare-earth salt are mixed;
the mixture thus obtained is reacted with a carbonate or a bicarbonate; and
the precipitate thus obtained is recovered.

The rare-earth salt may be an inorganic or organic salt. Preferably, water-soluble salts are used. As the rare-earth salt, mention may more particularly be made of the nitrate. The starting mixture may moreover contain, if necessary, a salt of the dopant element and what has been said for the rare-earth salts also applies here. The boric acid may be used in the form of a solution or, preferably, in solid form.

The mixing may be carried out at ambient temperature or else while heating.

Since the mixture thus obtained is acidic, it may be neutralized to a pH value of 4 or of around 4, for example by addition of an ammonia solution.

The second step of the process consists in reacting the mixture obtained in the preceding step with a carbonate or a bicarbonate.

As the carbonate or bicarbonate, it is possible to use, more particularly, ammonium carbonate or bicarbonate.

According to one variant, the reaction is carried out in the presence of a base. As the base that can be used, mention may be made of alkali metal or alkaline-earth metal hydroxides, aqueous ammonia and secondary, tertiary or quaternary amines. Preferably, aqueous ammonia is used.

It will be noted that, in the case of preparing a borate compound comprising a dopant or substituent, the dopant salt or substituent may be introduced therefore during the reaction if it has not been introduced during the preceding step.

According to one preferred embodiment, the reaction is carried out while adjusting the pH. This is understood to mean that the pH of the reaction medium is adjusted to a set value while allowing a variation of at most 0.5 pH units around this set value. This adjustment may be carried out by playing with the amount of base used for the reaction. This set value is preferably between 4 and 6.

The reaction may be carried out at ambient temperature or at high temperature.

A maturing step may optionally then be carried out. This step consists in keeping the reaction medium at a given temperature, preferably at a high temperature, at a constant pH and at the value described previously, optionally under a controlled atmosphere. The length of this maturing step is generally at least 15 minutes and at most 8 hours.

At the end of the reaction a borocarbonate or hydroxyborocarbonate precipitate is obtained which is separated from the reaction medium by any known means, for example by filtration, and which, optionally, is washed then dried.

It will be noted here that the processes described above make it possible to obtain either an orthoborate or an oxyborate depending on the stoichiometry of the starting reactants or on the Ln/B ratio in the starting reaction medium.

The description which has just been given relates to the preparation of the borate in the form of a suspension. In order to obtain the borate of the invention in the form of a powder, this suspension is used to start with and the solid product is separated from the liquid phase by using any known separation technique, for example by filtration. The solid product thus obtained may optionally be dried then put back into suspension in a liquid phase of the same type as that described above.

Owing to its properties and the nature of the dopant, Eu, Ce, Tb and Tm for example, the borates of the invention (this is understood to mean the borates in the form of a suspension or the borates in solid form) may be used as phosphors. These borates have luminescence properties under electromagnetic excitation in the range of wavelengths used in plasma systems (displays and lamps where the excitation is created by a rare gas or a mixture of rare gases such as xenon or/and neon) and in mercury vapor lamps in the case of borates doped with cerium and terbium in combination. Therefore, they may be used as phosphors in plasma systems (display screens or illumination systems) or in mercury vapor lamps.

The invention therefore also relates to luminescent devices comprising the borate described above or such as obtained by the process described above or manufactured by using this same borate. Similarly, the invention relates to plasma systems or mercury vapor lamps, in the manufacture of which the borate may be incorporated, or comprising this same borate. The use of phosphors in the manufacture of plasma systems is carried out according to well-known techniques, for example by screen printing, electrophoresis or sedimentation.

The particle size properties of the borates of the invention mean that they can be used as markers in semitransparent inks using the up-conversion mechanisms in the IR/visible range or luminescence mechanisms in the IR range, for example for producing marking by an invisible barcode system. In this case, the dopant pair will preferably be Yb and Er.

The borates of the invention may also be used as markers in a material of the paper, board, textile or glass type or else a macromolecular material. The latter may be of various natures: elastomeric, thermoplastic or thermosetting.

On the other hand, the particular properties of these borates, when they are not doped, in the visible and UV range (no absorption), mean that they can be used as a reflective barrier in mercury vapor system lamps.

The invention also relates to a luminescent material which comprises, or which may be manufactured by using, at least one borate according to the invention or a borate obtained by the process such as described above.

According to one preferential embodiment, this luminescent material may moreover be transparent. In this case, the borate incorporated into its composition or in its manufacture is a borate according to the invention having an average size between 100 nm and 200 nm, preferably between 100 nm and 150 nm.

It will be noted that this material may comprise, or be manufactured using, besides the borate of the invention, other borates, or more generally other phosphors, in the form of submicron or nanoscale particles.

This material may be in two forms, that is to say either in a bulk form, the whole of the material having the transparency and luminescence properties, or in a composite form, that is to say in this case in the form of a substrate and a layer on this substrate, the layer alone then having these transparency and luminescence properties. In this case, the borate of the invention is contained in said layer.

The substrate of the material is a substrate which may be made of silicon, based on a silicone or made of quartz. This may also be a glass or else a polymer such as polycarbonate. The substrate, for example the polymer, may be in a rigid form, in the form of a foil or sheet having a thickness of a few millimeters. It may also be in the form of a film having a thickness of a few tens of microns or even a few microns to a few tenths of a millimeter.

The term "transparent material" is understood within the meaning of the invention to mean a material which has a haze of at most 60% and a total transmission of at least 60% and, preferably, a haze of at most 40% and a total transmission of at least 80%. The total transmission corresponds to the total amount of light which passes through the layer, relative to the amount of incident light. The haze corresponds to the ratio of the diffuse transmission of the layer to its total transmission.

These two quantities are measured under the following conditions: the layer of material having a thickness between 0.2 µm and 1 µm is deposited on a standard glass substrate, having a thickness of 0.5 mm. The weight fraction of borate particles in the material is at least 20%. The measurements of the total transmission and of the diffuse transmission are carried out through the material layer and substrate, by means of a conventional procedure on a Perkin Elmer Lamda 900 spectrometer, equipped with an integrating sphere, for a wavelength of 550 nm.

The material, and more particularly the aforementioned layer, may comprise, besides a borate according to the invention, binders or fillers of the following type: polymer (polycarbonate, methacrylate), silicate, silica bead, phosphate, titanium oxide or other mineral fillers in particular to improve the mechanical and optical properties of the material.

The weight fraction of borate particles in the material may be between 20% and 99%.

The thickness of the layer may be between 30 nm and 10 µm, preferably between 100 nm and 3 µm and more preferably still between 100 nm and 1 µm.

The material, in its composite form, may be obtained by depositing a borate suspension of the invention onto the substrate, which has optionally previously been washed, for example with a sulfochromic mixture. It is also possible to add, at the time of this deposition, the binders or fillers mentioned above. This deposition may be carried out by a spraying, spin-coating or dip-coating technique. After depositing the layer, the substrate is dried in air and it may optionally then undergo a heat treatment. The heat treatment is carried out by heating to a temperature which is generally at least 200° C. and whose upper value is fixed, especially by taking into account the compatibility of the layer with the substrate so as to avoid, in particular, side reactions. The drying and heat treatment may be carried out in air, in an inert atmosphere, under vacuum or else in hydrogen.

It has been seen above that the material may comprise binders or fillers. It is possible in this case to use suspensions which themselves comprise at least one of these binders or these fillers or else precursors of the latter.

The material in the bulk form may be obtained by incorporating borate particles into a polymer-type matrix, for example a polycarbonate, polymethacrylate or silicone matrix.

The invention finally relates to a luminescent system which comprises a material of the type described above and, in addition, an excitation source which may be a UV photon source, such as a UV diode or else an excitation of the Hg, rare gas or X-ray type.

The system may be used as a transparent wall illumination device, of the illuminating glazing type.

Examples will now be given. In these examples the particle size was determined according to the aforementioned laser diffraction technique. It is additionally specified that the measurement was carried out with a Coulter type machine on suspensions diluted to a concentration between 1 g/l and 10 g/l and which had previously undergone the action of an ultrasonic probe (450 W probe) for 2 minutes and 30 seconds.

EXAMPLE 1

This example relates to the preparation of a suspension of an yttrium, gadolinium and europium borate according to the invention.

A solution was composed from a mixture of yttrium, gadolinium and europium nitrates, having the following composition (in at %):

Y: 72%
Gd: 23%
Eu: 5%.

In a reactor containing demineralized water, crystalline boric acid and the solution of rare-earth nitrates (Ln) were mixed in proportions such that the B/Ln molar ratio was equal to 1.5.

Next, the mixture thus formed was neutralized to a pH of 4.4 with 6N aqueous ammonia, then the concentration of the mixture was adjusted to 0.6 mol/l of Ln elements by addition of water.

A precipitating solution of ammonium bicarbonate having a concentration of 1.34 mol/l of $NH_4HCO_3$ and of 0.7 mol/l aqueous ammonia was added gradually to 2.8 l of the preceding solution, stirred and heated at 60° C. During this addition, the pH was kept at a value of at least 4.6 by addition of 6N aqueous ammonia. The addition of the precipitating solution was stopped as soon as the pH of the mixture reached the value of 5, the rare-earth concentration of the mixture obtained was 0.39 mol/l.

Throughout the entire reaction, the temperature of the reaction medium was kept constant and equal to 60° C.

This mixture then continued to be heated and stirred for 40 minutes.

The precipitate was then filtered over a Büchner funnel, then washed with 2 l of a 2 g/l (0.03 mol/l) boric acid solution.

The solid obtained was dried at 60° C. overnight, then calcined at 850° C. for 1 hour and 15 minutes.

The powder obtained after slight deagglomeration corresponded, by X-ray diffraction analysis, to a pure rare-earth orthoborate, of $YBO_3$ type, with spherical-shaped particles.

The powder obtained was subjected to wet grinding in a Molinex ball mill with 0.4-0.8 mm balls made of $ZrO_2/SiO_2$. The amount of space the balls occupied in the grinding chamber was 65%, and the rotational speed of the spindle was 1000 rpm. The concentration of the suspension was 20 wt % of solid, and a dispersant, sodium hexametaphosphate (HMP) was added in an amount of 0.05 g HMP/g borate powder (i.e. 5 wt %). The grinding lasted 90 minutes.

Laser particle size analysis gave the following results:

| | |
|---|---|
| $d_{16}$ (nm) | 71 |
| $d_{50}$ (nm) | 150 |
| $d_{84}$ (nm) | 207 |
| σ/m | 0.45 |

The analysis of the sample thus obtained by X-ray diffraction revealed a $YBO_3$ type phase, with a coherent domain size in the [102] direction of 104 nm.

It was observed that the value of the $d_{50}$ (laser) and that of the coherent domain size had the same order of magnitude, which confirms the single-crystal nature of the particles.

EXAMPLE 2

This example relates to the preparation of a suspension of an yttrium, gadolinium and terbium borate according to the invention.

The synthesis was identical to that from Example 1, replacing europium with terbium, with the following composition (in at %):

Y: 58%
Gd: 33%
Tb: 9%.

The powder obtained after drying and calcining at 850° C. had the same morphological properties as in Example 1.

The wet grinding of this powder was carried out in ethanol, in a Netzsch Labstar ball mill (polyurethane-coated grinding module—maximum acceptable temperature of 60° C.-0.1 mm screen-920 ml chamber volume). The balls used were 0.4-0.8 mm balls made of $ZrO_2$—$SiO_2$, with the amount of space occupied by the balls being 70%. The concentration of the suspension was 20 wt % of solid. The grinder was used in recirculating mode, with a rotational speed of 3000 rpm.

The particle size properties were thus the following:

| | |
|---|---|
| $d_{16}$ (nm) | 190 |
| $d_{50}$ (nm) | 280 |
| $d_{84}$ (nm) | 430 |
| σ/m | 0.43 |

The enclosed FIGURE is a photo obtained by TEM of the suspension resulting from the grinding. This photo shows the single-crystal nature of the particles.

EXAMPLE 3

This example also relates to the preparation of a borate according to the invention in powder form.

The synthesis is identical to Example 2, then the pulp resulting from the wet grinding is dried for 24 hours at ambient temperature.

The dry product in powder form thus obtained is put back into suspension in water in order to give a suspension.

The particle size properties of the suspension are thus the following:

| | |
|---|---|
| $d_{16}$ (nm) | 225 |
| $d_{50}$ (nm) | 329 |
| $d_{84}$ (nm) | 483 |
| σ/m | 0.39 |

EXAMPLE 4

This example relates to the preparation of a material that is transparent, luminescent and emits red light.

The suspension from Example 1 (3 ml at 40 g/l) was mixed with a 20 g/l solution of sodium hexameta-phosphate in solution in water, in proportions such that the polyphosphate/borate ratio was 10 wt %. The mixture was deposited on a glass substrate, which had previously been rendered hydrophilic (30 second plasma treatment), by spin-coating (1900 rpm for 65 seconds). The film was then dried for 1 hour at 120° C. in an oven. Two successive depositions were carried out. The thickness of the layer after deposition was around 300 nm.

A transparent film luminescent to the eye under UV excitation was obtained.

The film had a total transmission of 86% and a haze of 18% at 550 nm (values measured under the conditions described above). The film luminesced in the red under UV excitation (230 nm) and VUV excitation (172 nm). The luminosity and the transparency of the film were not impaired after a thermal post-treatment (at 450° C. for 1 hour), and also under UV irradiation (24 h at 230 nm).

The invention claimed is:

1. A liquid suspension of submicron particles of substantially monocrystalline rare-earth borates, said particles having an average particle size ranging from 100 to 400 nm, and a dispersion index of at most 0.7; and the suspension having a concentration of 10 g/L to 200 g/L.

2. The liquid suspension as defined by claim 1, said particles having an average size ranging from 100 to 300 nm.

3. The liquid suspension as defined by claim 1, said particles having a dispersion index of at most 0.5.

4. The liquid suspension as defined by claim 1, comprising essentially no particle agglomerates.

5. The liquid suspension as defined by claim 1, the liquid phase thereof comprising water, a water/water-miscible solvent mixture, or an organic solvent.

6. The liquid suspension as defined by claim 1, the rare-earth(s) forming said rare-earth borates being selected form the group consisting of yttrium, gadolinium, lanthanum, lutetium and scandium.

7. The liquid suspension as defined by claim 1, the rare-earth borates further comprising at least one dopant of at least one element selected from the group consisting of antimony, bismuth and a rare earth other than that or those which form(s) said borate(s).

8. The liquid suspension as defined by claim 7, comprising at least one rare-earth dopant selected from the group consisting of cerium, terbium, europium, thulium, dysprosium, holmium, ytterbium, neodymium, erbium and praseodymium.

9. The liquid suspension as defined by claim 1, comprising at least one orthoborate and/or oxyborate.

10. The liquid suspension as defined by claim 7, comprising at most 50 mol % of dopant relative to the rare-earth borate.

11. The liquid suspension as defined by claim 1, further comprising at least one dispersant.

12. The liquid suspension as defined by claim 11, said at least one dispersant comprising a polyphosphate, metaphosphate, silicate, aminoalcohol, phosphonate, citric acid or salt thereof, phosphosuccinic acid derivative, polyacrylic or polymethacrylic acid derivative, and/or sulfonic acid derivative or salt thereof.

13. A phosphor comprising the liquid suspension as defined by claim 1.

14. A liquid suspension of submicron particles, the suspension comprising:
rare-earth borate particles, at least 90% of the particles in the form of a single crystal;
the rare earth borate particles comprising, at least in part, at least one of an orthoborate or an oxyborate;
the particles having an average particle size of 100 to 400 nm, and a dispersion index of at most 0.7; and
the suspension having a concentration of particles of 10-200 g/L.

15. The suspension of claim 14, wherein the suspension has a concentration of particles of 40-100 g/L.

16. The suspension of claim 14, wherein the particles further comprise at least one dopant, the rare-earth and the dopant having different luminescence properties.

* * * * *